(12) United States Patent
Wang et al.

(10) Patent No.: US 10,884,613 B2
(45) Date of Patent: Jan. 5, 2021

(54) METHOD AND DEVICE FOR INPUT WITH CANDIDATE SPLIT MODE

(71) Applicant: Shanghai Chule (CooTek) Information Technology Co., Ltd., Shanghai (CN)

(72) Inventors: Jialiang Wang, Shanghai (CN); Hongbo Xue, Shanghai (CN); Zhaowen Zhou, Shanghai (CN); Kun Wu, Shanghai (CN); Wenmao Zhang, Shanghai (CN); Yun Dai, Shanghai (CN); Yuan Mei, Shanghai (CN)

(73) Assignee: SHANGHAI CHULE (COOTEK) INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/075,923

(22) PCT Filed: Feb. 6, 2017

(86) PCT No.: PCT/CN2017/072946
§ 371 (c)(1),
(2) Date: Dec. 21, 2018

(87) PCT Pub. No.: WO2017/133697
PCT Pub. Date: Aug. 10, 2017

(65) Prior Publication Data
US 2019/0121533 A1 Apr. 25, 2019

(30) Foreign Application Priority Data
Feb. 6, 2016 (CN) .......................... 2016 1 0083051

(51) Int. Cl.
*G06F 3/048* (2013.01)
*G06F 3/0488* (2013.01)
(Continued)

(52) U.S. Cl.
CPC .......... *G06F 3/04883* (2013.01); *G06F 3/018* (2013.01); *G06F 3/0237* (2013.01);
(Continued)

(58) Field of Classification Search
CPC ......... G06F 17/243; G06F 2203/04809; G06F 40/174; G06F 3/018; G06F 3/0237;
(Continued)

(56) References Cited

U.S. PATENT DOCUMENTS 6,223,059 B1 * 4/2001 Haestrup ............... G06F 3/0237
345/172
10,255,267 B2 * 4/2019 Chaudhri ............ G06F 3/04842
(Continued)

FOREIGN PATENT DOCUMENTS

| CN | 101699385 A | 4/2010 |
|---|---|---|
| CN | 102023782 A | 4/2011 |

(Continued)

OTHER PUBLICATIONS ip.com search note 2 pages.*
(Continued)

*Primary Examiner* — Haoshian Shih
(74) *Attorney, Agent, or Firm* — Flener IP & Business Law; Zareefa B. Flener

(57) ABSTRACT

A method and device for secondary input of text are disclosed. The method may include: detecting a touch action, if the touch action meets a triggering requirement for a candidate split mode, activating the candidate split mode, and in the candidate split mode, selecting and splitting one of candidate results into an acceptable part and a pending part, wherein the acceptable part is presented in a target text field and a new candidate is acquired based on the character string corresponding to the pending part. With the present disclosure, users are allowed to modify a candidate result at any
(Continued)

time as desired by retaining an accepted part of the candidate result during the input process, so as to simplify the input process. This entails a more prompt and more efficient input feedback mechanism which simplifies the user's manipulation and improves the user's experience.

22 Claims, 14 Drawing Sheets

(51) Int. Cl.
*G06F 3/01* (2006.01)
*G06F 3/023* (2006.01)
*G06F 3/0489* (2013.01)
*G06F 40/174* (2020.01)
*G06F 3/0482* (2013.01)

(52) U.S. Cl.
CPC ........ *G06F 3/0482* (2013.01); *G06F 3/04886* (2013.01); *G06F 3/04895* (2013.01); *G06F 40/174* (2020.01); *G06F 2203/04809* (2013.01)

(58) Field of Classification Search
CPC ............... G06F 3/04883; G06F 3/0482; G06F 3/04886; G06F 3/04895
See application file for complete search history.

(56) References Cited

U.S. PATENT DOCUMENTS

| | | | |
|---|---|---|---|
| 2007/0156747 A1* | 7/2007 | Samuelson | G06F 16/954 |
| 2011/0202876 A1* | 8/2011 | Badger | G06F 3/0237 |
| | | | 715/816 |
| 2014/0208209 A1* | 7/2014 | Na | G06F 3/167 |
| | | | 715/728 |

FOREIGN PATENT DOCUMENTS

| | | |
|---|---|---|
| CN | 102541282 A | 7/2012 |
| CN | 102893238 A | 1/2013 |
| CN | 103760990 A | 4/2014 |
| CN | 103838458 A | 6/2014 |
| CN | 104508616 A | 4/2015 |
| CN | 105759984 A | 7/2016 |

OTHER PUBLICATIONS

First Office Action for Application No. or Publication Issue No. 201610083051.4, The State Intellectual Property Office of People's Republic of China.
Patent Cooperation Treaty, Written Opinion of the International Searching Authority, International Application No. PCT/CN2017/072946.
International Search Report, International Application No. PCT/CN2017/072946.

\* cited by examiner

METHOD AND DEVICE FOR INPUT WITH CANDIDATE SPLIT MODE

TECHNICAL FIELD

The present disclosure relates to the field of electronics and, in particular, to the application of electronic devices and, even more particularly, to a method and device for secondary input of text.

BACKGROUND

Nowadays, portable electronic devices such as smartphones and tablets are increasing their popularity. As basic means for human-machine interaction, text input methods play a direct role in user experience on those electronic devices.

Speed and accuracy at which text is allowed to be entered are principal metrics for assessing the performance of a text input method. Continual efforts have been made in the art to make as many candidate words or phrases as possible available with minimized user intervention. With existing text input methods, users' attempts for one-time input of a long sentence are often frustrated by one or more undesirable inaccuracies in the candidate text. In such cases, one of the following correction methods has to be resorted to:

1) Selecting and deleting the wrong candidate text and then making another attempt. This solution can complicate the users' manipulation and it is often the case that a long passage must be deleted just because of one or two minor errors therein.

2) Instead of selecting the wrong candidate text, editing the typed text string until the correct candidate text is reached. In this approach, as the candidate text changes with the edition, multiple attempts are usually required before the expected result can be achieved.

Both of the above methods fail in taking into account the fact that the candidate text is partially correct, and the entire deletion and edition increases the required computation and users' manipulation complexity.

SUMMARY

It is an object of the present disclosure to overcome the aforementioned shortcomings of the conventional methods by presenting a mechanism for secondary input of text which is capable of reducing the required computation and making full use of a character string entered by the user by allowing the user to edit any candidate result acquired based on the entered character string without compromising any desired part of the candidate result.

To this end, the present disclosure provides a method for secondary input of text. According to some embodiments of the present disclosure, the method includes: detecting a touch action, when the touch action meets a triggering requirement for a candidate split mode, activating the candidate split mode, in which, selecting one of candidate results and splitting the selected candidate result into an acceptable part and a pending part; wherein, the acceptable part is added into a target text field directly and a secondary candidate is further acquired based on a character string corresponding to the pending part.

In other aspects of the present disclosure, there is also provided a device for secondary input of text, comprising an interaction module, adapted to detect a touch action, when the touch action meets a triggering requirement for a candidate split mode, activate the candidate split mode and, in the candidate split mode, select one of candidate results and split the selected candidate result into an acceptable part and a pending part, wherein the acceptable part is set to be presented into a target text field directly; and an engine module, adapted to acquire a secondary candidate result based on the pending part.

According to some aspect of the mechanism for secondary input of text proposed in the present disclosure, the user is allowed to modify any candidate result at any time as desired while retaining the desired part during the input process. This entails a more prompt and more efficient input feedback approach which simplifies the user's manipulation and improves the user's experience.

According to other aspect of the mechanism for secondary input of text proposed in the present disclosure, the input speed and accuracy can be improved by allowing acquisition of secondary candidate results for an undesired part of a candidate result, modification of an entered character string based on the used keyboard layout and correction of only any erroneous part of an entered character string without affecting the acceptance of a correct candidate result corresponding to the remainder of the character string.

According to further aspect of the mechanism for secondary input of text proposed in the present disclosure, better human-machine interaction and wide applicability can be achieved through allowing the split position to be so adjusted that a maximum number of correct characters in a candidate result can be added to the target text field, leaving a minimized number of characters to be corrected subsequently.

DETAILED DESCRIPTION

Figure 1:
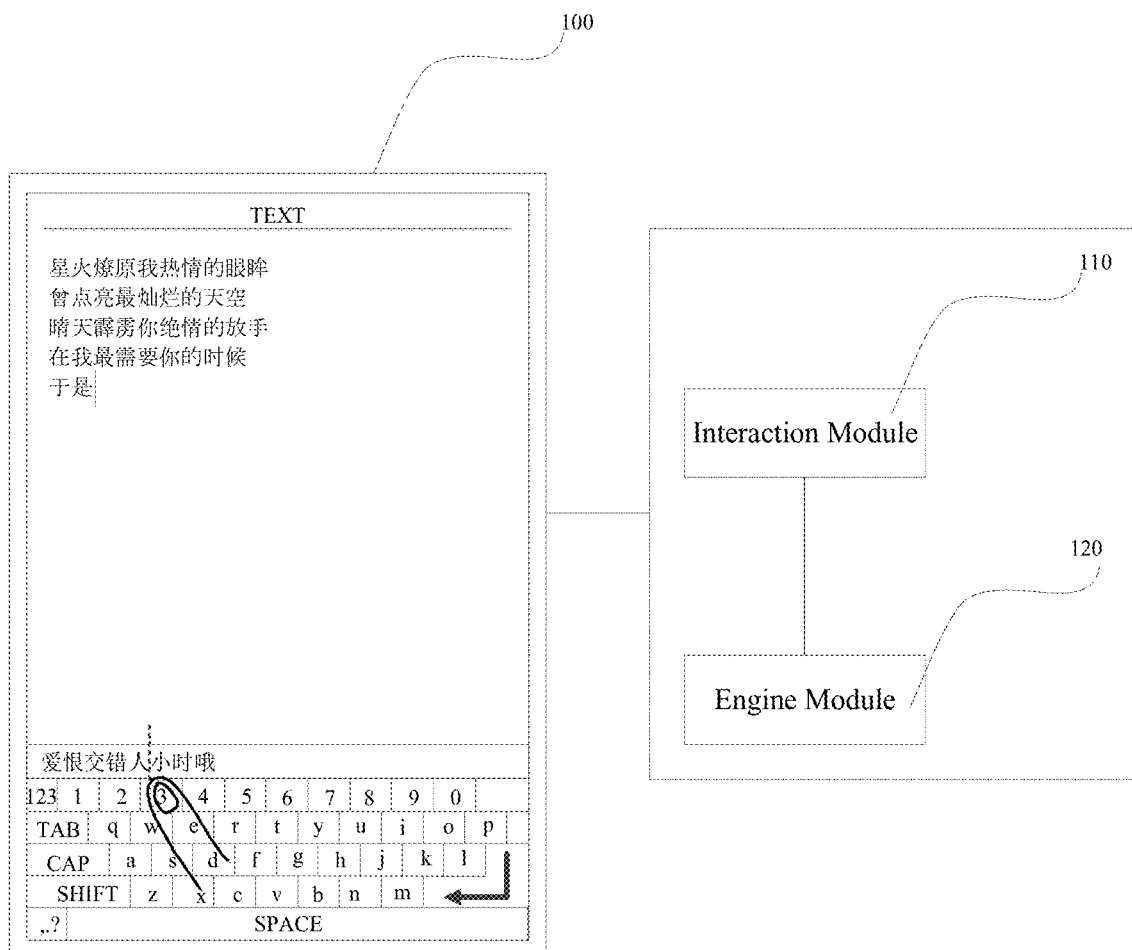
FIG. 1 shows a schematic overview of an embodiment of a device for secondary input of text according to some aspects of the present disclosure.

Exemplary embodiments will be described more fully hereinafter with reference to the accompanying drawings, throughout which like reference numerals indicate similar or identical elements. Although a few exemplary examples and features of the present disclosure are disclosed below, modifications, alterations and alternative constructions of the invention made without departing the concepts thereof, such as equivalent substitutions, additions or modifications to elements illustrated in the drawings, or substitutions, reordering or additions of steps, shall not be construed as limiting the invention in any way, and the true scope thereof is intended to be defined by the appended claims.

According to some embodiments, the present disclosure proposes a mechanism for secondary input of text in which one of predicted candidate results is split into an acceptable part and a pending part based on a touch action. The pending part is then reverted back to the corresponding character string, based on which another prediction can be conducted or which can be corrected based on the used keyboard layout in order to obtain a correct secondary candidate result. In this way, the correction of the reverted character string is separated from the entry of the remaining correct part of the candidate result, allowing higher input speed and accuracy. According to some embodiments, the present disclosure enables the user to extract desired content from a candidate result containing one or more errors with simple manual manipulations and directly add it to the target text field without performing redundant edition steps such as deletions, re-entries and reconfirmations as required when using conventional text input methods. As a result, a much higher input speed can be achieved and the text input itself becomes a simple and easy task.

FIG. 1 shows an exemplary block diagram of an embodiment of a device 100 embodying the aforementioned mechanism for secondary input of text. According to some embodiments, the device 100 may be, for example, a mobile phone, a smart phone, a PDA or any other electronic device with text input capabilities, such as a tablet, a camera, a wearable electronic device, a car navigator or an electronic interactive terminal deployed in a public place such as a station or school. According to some embodiments, during the input of text information by a user using a touch screen of the device 100, there may be the case that candidate text displayed in response to the typing of a text string is not what the user is expecting. For example, although the user wants to enter "爱恨交错人消瘦 (Chinese phonetic alphabet: Ai Hen Jiao Cuo Ren Xiao Shou)", if he/she accidentally misspells the character string corresponding to the trailing word "消瘦 (Chinese phonetic alphabet: Xiao Shou)", i.e., "xiaoshou", as "xiaoshio", "爱恨交错人小时哦 (Chinese phonetic alphabet: Ai Hen Jiao Cuo Ren Xiao Shi O)" may be displayed that does not make any sense. In this case, the user is allowed to simply split the candidate result into two parts, i.e., the correct "爱恨交错 人 (Chinese phonetic alphabet: Ai Hen Jiao Cuo Ren)" and the erroneous "小时哦 (Chinese phonetic alphabet: Xiao Shi O)". The correct part is suitable to be directly added to the target text field, and the wrong part can be reverted back to "xiaoshio" which can then be subjected to another prediction for the correct result. According to some embodiments, the proposed mechanism for secondary input of text involves, but not limited to, resorting to a touch screen for character string input or candidate result selection or splitting. However, these tasks may also be accomplished otherwise, for example, character strings may also be input using a conventional mechanical keyboard or mouse or limb sensing functionality of a wearable electronic device, and the limb sensing functionality may further be utilized to select or split a candidate result. It will be appreciated by those skilled in the art that any other technique functioning in a similar way as the touch action that may emerge in the future with the development of technology may also be used for text input, triggering of the candidate split mode or selection or splitting of the candidate result in lieu of the touch action.

According to some embodiments of the present disclosure, the device 100 may include: an interaction module 110, adapted to interact with the user, detect the touch action, determine whether the touch action meets a triggering requirement for the candidate split mode, trigger the candidate split mode when the determination is positive, select at least one predicted candidate result in the candidate split mode, split the candidate result into an acceptable part and a pending part, and add the acceptable part to the target text field directly; and an engine module 120, adapted to revert the pending part back to the corresponding character string and, based thereon, acquire a secondary candidate result.

The subject matter of the present disclosure can be more readily understood upon reading a detailed description of specific embodiments set forth below.

Figure 2:
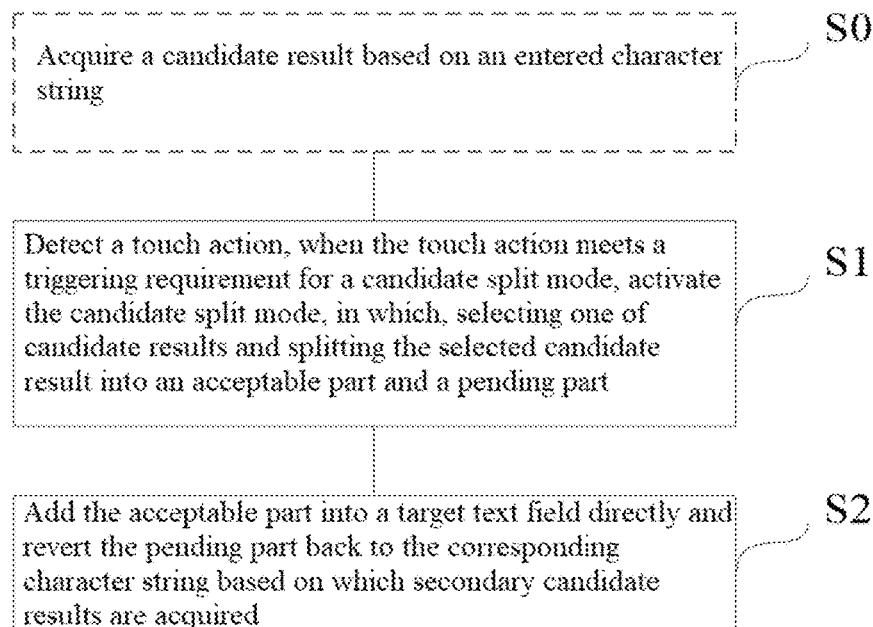
FIG. 2 is a flowchart graphically illustrating an embodiment of a method for secondary input of text according to some aspects of the present disclosure.

Reference is now made to FIG. 2, a flowchart graphically illustrating steps in an embodiment of a method for secondary input of text according to the present disclosure.

In step S1: in the event of a detected touch action meeting a triggering requirement for a candidate split mode, the candidate split mode is activated in which at least one of predicted candidate results is selected and split into an acceptable part and a pending part.

In step S2: add the acceptable part to the target text field directly, and revert the pending part back to the corresponding character string based on which secondary candidate results are acquired.

According to some embodiments of the present disclosure, in the course of text input, when none of predicted candidate results are just as expected due to one or more wrong characters in an entered character string on which the prediction is based or due to imperfectness of the prediction, the user can take an action to split one of the candidate results into a desired part (i.e., the acceptable part) and an undesired part (i.e., the pending part). Subsequently, the desired part of the candidate result is added to the target text field, and the undesired part (i.e., the pending part) is subjected to another prediction or association process so that secondary candidate results can be obtained.

It is to be particularly noted that, according to the present disclosure, splitting, based on the user's touch action, the candidate result into the desired part (i.e., acceptable part), which is subsequently added to the target text field directly, and the undesired part (pending part) which is then subjected to another prediction or association process or modified to obtain secondary candidate results immunizes the desired part in the candidate result from any impact from the undesired part (i.e., pending part) therein. This gives full play to the user's subjective initiative and greatly improves the human-machine interaction experience thereof. Additionally, with the present disclosure, text input efficiency can also be augmented because, instead of deleting the majority of the entered character string, the user only need to revert the pending part back to the corresponding character string and optically correct the reverted character string.

According to some embodiments, the method may further comprise, prior to step S1, a step (S0) in which the candidate results are acquired based on the entered character string. Specifically, in response to the entered character string incoming via the interaction module 110, the engine module 120 performs a search for candidate results matched with the entered character string and provides the candidate results to the user via the interaction module 110.

Figure 3:
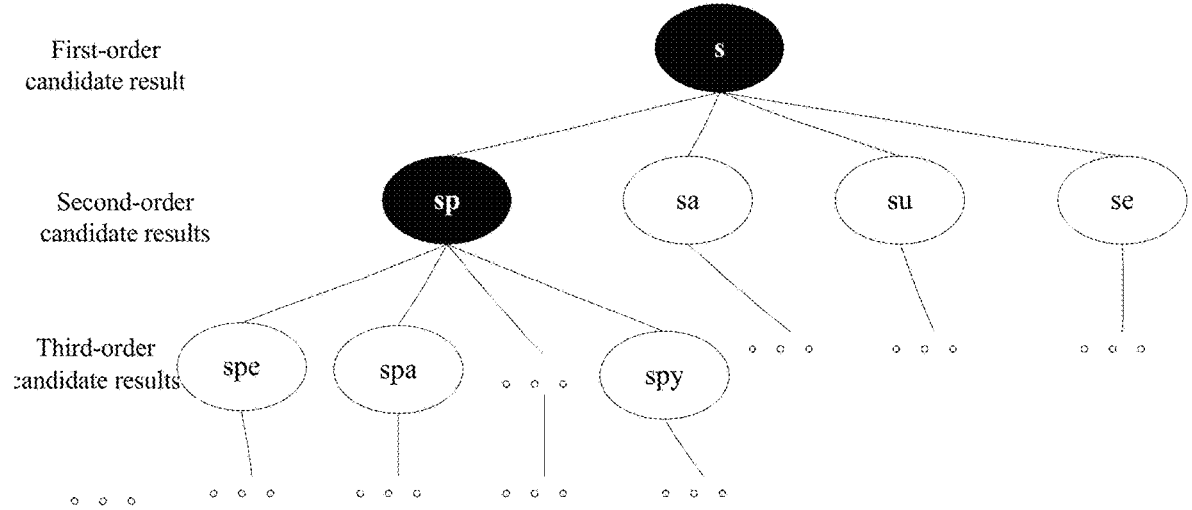
FIG. 3 is a schematic diagram illustrating data involved an embodiment of acquisition of candidate results in step S10 of FIG. 2.

FIG. 3 shows a flowchart graphically illustrating hierarchical candidate acquisition according to a preferred embodiment of the present disclosure. When the user types "s", the character is then taken as a first-order candidate result based on which the engine module 120 carries out a prediction and association process for acquiring second-order candidate results such as, for example, "sa", "sp", "su", etc. When the user further types "p", the interaction module 110 passes the character onto the engine module 120 which then performs another search based on the character string "sp". Here, it is to be noted that the engine module 120 may acquire candidate results of at least one order based on the entered character string and provide them to the user. For example, in response to "sp" typed by the user, candidate results such as "spe" and "spec" will appear in the candidate field on the screen. This process is repeated until the user selects or handles a candidate result. In another preferred embodiment, the engine module 120 may rank the candidate results based on the user's preferences in order to facilitate his/her selection of the desired candidate result.

According to some embodiments of the present disclosure, the method of the invention may be applicable to text input in any language as long as candidate prediction and selection is involved therein.

Figure 5:
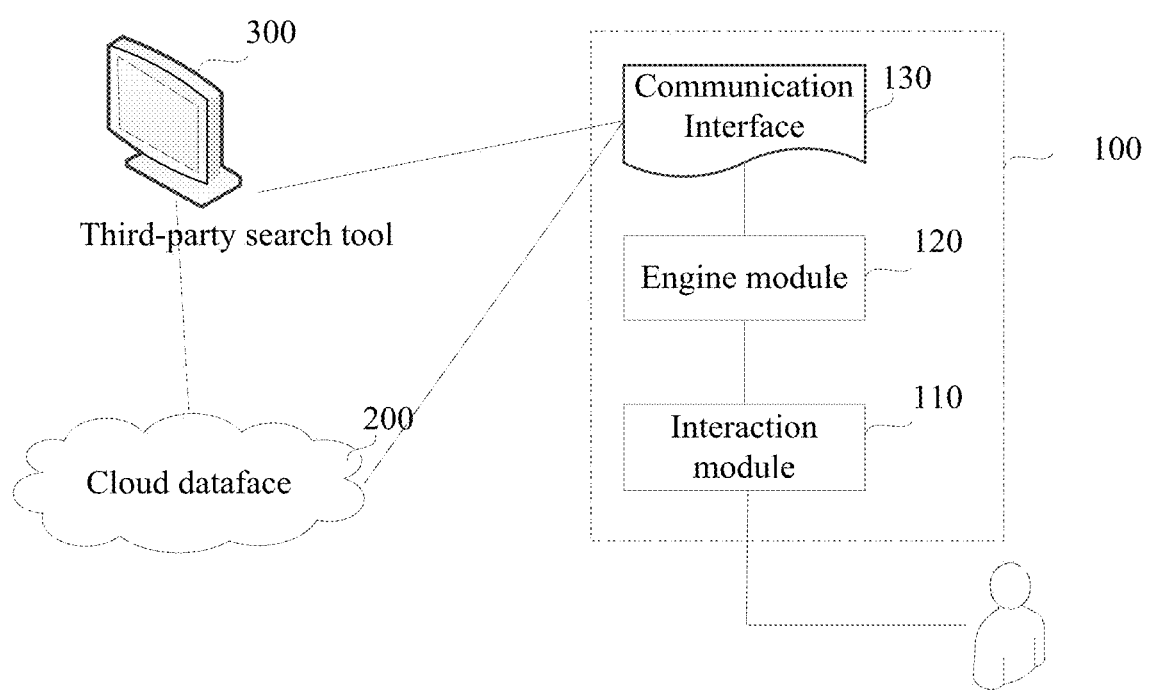
FIG. 5 shows a schematic overview of another embodiment of the device according to some aspects of the present disclosure.

In one embodiment, in the method of the present disclosure, candidate words may be predicted based on the character string entered by the user through accessing a local database within the device 100. In another preferred embodiment, as shown in FIG. 5, the method may also be applicable to a device 100 without an internal database. In this case, the device 100 may be further provided with a cloud database 200 or a third-party search tool 300 adapted to exchange data with the device via a communication interface 130. After locally receiving the character string entered by the user, the device 100 may send the character string to the cloud database 200 via the communication interface 130 where a search is performed for corresponding candidate words, or the candidate words may be acquired from a search performed by the search tool 300.

According to some embodiments of the present disclosure, with the method for secondary input of text, when the user enters a string of characters, for example, "woaibeijingti", the candidate results "我爱北京提 (Chinese phonetic alphabet: Wo Ai Bei Jing Ti)", "我爱北京天安嫩 (Chinese phonetic alphabet: Wo Ai Bei Jing Tian An Nen)", "我爱 (Chinese phonetic alphabet: Wo Ai)", "我矮 (Chinese phonetic alphabet: Wo Ai)" etc. may be acquired from a search performed by the engine module 120 based on the entered character string. These candidate results corresponding to "woaibeijingti" may be obtained from, for example, a search based on all the actually entered characters without prediction or association based on any other character that has not been entered (e.g., "我爱北京提 (Chinese phonetic alphabet: Wo Ai Bei Jing Ti)"), or a search based on actually entered characters (e.g., "我爱 (Chinese phonetic alphabet: Wo Ai)" and "我矮 (Chinese phonetic alphabet: Wo Ai)"), or a search based on all the actually entered characters with prediction or association (e.g., "我爱北京天安嫩 (Chinese phonetic alphabet: Wo Ai Bei Jing Tian An Nen)"). In other embodiments, candidate results of other types may also be possible, from which the use may select one and add it or a desired part (i.e., acceptable part) of it to the target text field. The present disclosure is not limited to any particular type of candidate results.

After at least one candidate result is acquired based on the user's input, step S1 is carried out. Specifically, one of the at least one candidate result is selected based on a detected touch action and it is determined whether a triggering requirement for the candidate split mode is satisfied. If the determination is positive, the candidate split mode is activated in which the selected candidate result is split into an acceptable part and a pending part.

Figure 4:
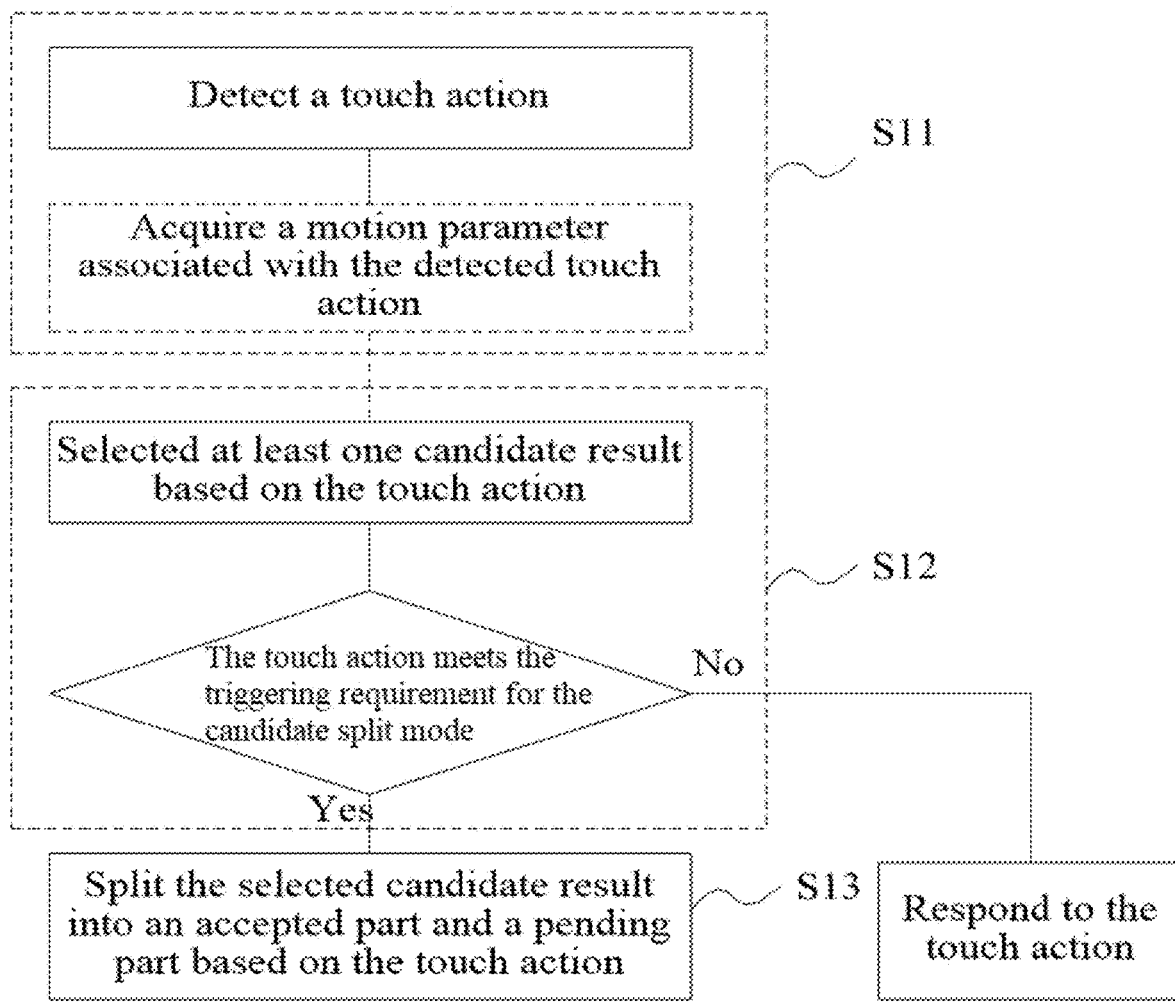
FIG. 4 is a flowchart graphically illustrating an embodiment of step S1 of FIG. 2.

Referring to FIG. 4, in one embodiment, step S1 may further include the steps of:

(S11) detecting the touch action;

(S12) selecting at least one predicted candidate result based on the touch action, determining whether the touch action meets the triggering requirement for the candidate split mode and activating the candidate split mode if the determination is positive; and (S13) splitting the selected candidate result into the acceptable part and the pending part based on the touch action.

In one embodiment, step S11 may further include: acquiring a motion parameter associated with the detected touch action.

Specifically, the coordinate of a particular point associated with the touch action may be acquired. For example, the coordinate of a start, stay, end or turning point associated with the touch action can be detected and recorded. The motion parameter associated with the touch action may also be acquired as, for example, an angle at the particular point, a length from the start point to the particular point or a stay time at the particular point. The particular point may be determined in advance. For example, the start, stay, end or turning point associated with the touch action may be taken as the particular point. The particular point may also be calculated from another motion parameter associated with the touch action. For example, it may be a turning point with a turning angle in a preset range such as, for example, <90° or >180°, or a midpoint with a stay time exceeding a certain threshold.

Next, step S12 is performed in which the at least one predicted candidate result is selected based on the acquired motion parameter.

In one embodiment, the selection from the predicted candidate results based on the motion parameter may include: identifying the selected candidate result by comparing the acquired motion parameter with motion parameters associated with the individual candidate results. Specifically, the motion parameter may be the coordinate of a particular point associated with the touch action, and the coordinate may be compared with coordinates associated with the candidate results. Any of the candidate result whose coordinate has a difference from the coordinate of the particular point associated with the touch action that is within a predetermined range may be selected. Similarly, the candidate result may also be identified and selected based on a comparison with the aforementioned angle, stay time or length as the motion parameter.

In another embodiment, overlaps between an area defined by a trajectory associated with the touch action and areas of the candidate results may be compared. Specifically, the trajectory associated with the touch action may define a closed area, and any of the candidate result with an overlap with the closed area that accounting for a fraction of its area that greater than a predetermined value may be selected.

In still another embodiment, the candidate result may also be selected based on the trajectory shape or direction of the touch action. For example, the candidate result may be selected based on an analysis or comparison performed on the shape of the trajectory associated with the touch action. In a specific implementation, correspondence of trajectory shapes to types or numerals, for example, circular for "1", triangular for "2" and square for "3", may be established beforehand. The shape of the trajectory associated with the touch action may then be analyzed to determine the corresponding numeral based on which the candidate result can be selected. In other embodiments, the candidate result may also be selected based on an analysis on the direction of the touch action.

Figure 6:
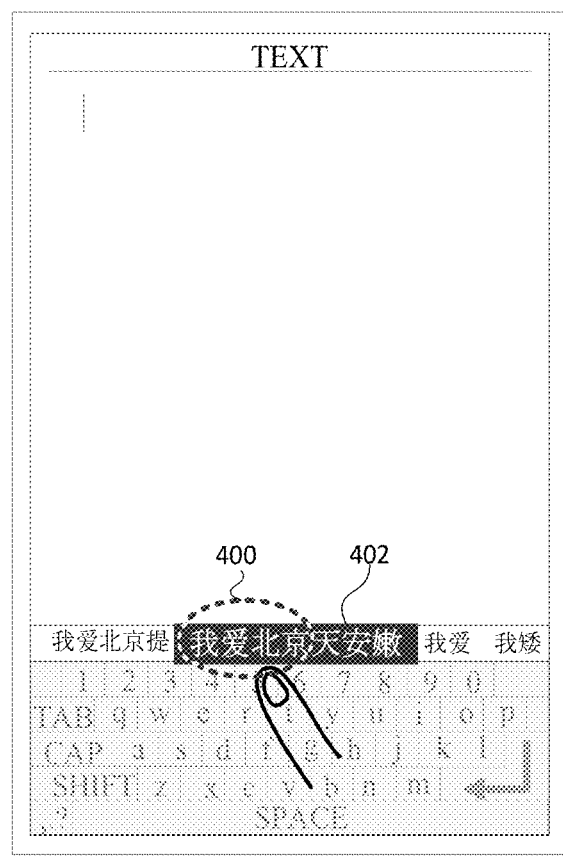
FIGS. 6 to 8 are schematic diagrams showing operations for triggering a candidate split mode in a specific embodiment of a method for secondary input of text according to some aspects of the present disclosure.

According to some aspects of the present disclosure, referring to FIG. 6, an indication may be additionally given in respect of the selected candidate result. For example, when a candidate result 402 is selected based on the touch action, the candidate result 402 may be displayed brighter or in a different color, indicating that it is being manipulated by the user.

In step S12, based on the length, stay time, trajectory shape, direction, start or the like associated with the touch action that is acquired in step S11, it may also be determined whether the touch action meets the triggering requirement for the candidate split mode. The triggering requirement may include one or a combination of the conditions as detailed below.

Specifically, step S12 may further include activating the candidate split mode when it is determined that a length of the trajectory associated with the touch action is longer than a predetermined length, or that a stay time associated with the touch action is longer than a predetermined time period threshold, or that the shape of the trajectory associated with the touch action is matched with a predetermined triggering shape, or that a ratio of an overlap of the candidate result with a pattern defined by the trajectory associated with the touch action to the total area of the candidate result is greater than a predetermined ratio, or that the start point associated with the touch action is located within a predetermined trigger region.

In a preferred embodiment, the candidate split mode is triggered when the length of the trajectory associated with the detected touch action is longer than the predetermined length. The length of the trajectory may be a linear distance between start and end points of the trajectory. For example, the candidate split mode may be activated when the linear distance is longer than the predetermined length. Here, the direction of the touch action may be any direction (i.e., with the aid of a configuration module, the user may define the direction of the touch action as a slide direction and set that the candidate split mode is triggered when the slide direction is pointing straight downward, straight upward, downward to the left or downward to the right, etc.) For example, the touch action may be a slide starting from a point in the area of the candidate result or from another point on the screen and proceeding in a predetermined direction, for example, a direction pointing straight downward. When a linear distance between start and end points of the slide exceeds the predetermined length, the candidate split mode may be activated. In another preferred embodiment, the slide may proceed downward or upward and traverse across the selected candidate result. In response, the candidate result may be split into two parts respectively on the left and right of the slide trajectory.

In another preferred embodiment, the touch action may be a press at a point on the screen, and when the press lasts for a period of time that is longer than a predetermined time period threshold, the candidate split mode may be triggered. The point may be a predefined triggering point or a point in a predefined triggering region, and the candidate split mode may be activated when the user presses the screen at the point for a period of time that is longer than the predetermined time period threshold. The triggering region may be a candidate field, the area of a particular key of the keyboard, or a region designated by the user.

In a further preferred embodiment, the candidate split mode may be triggered when the shape of the trajectory associated with the detected touch action is matched with a predetermined trajectory shape such as, for example, a circle, a square, a triangle or another shape predefined by the user. In this embodiment, detecting the trajectory associated with the touch action and determining whether to activate the candidate split mode by comparing the shape of a pattern formed by the trajectory with the predetermined shape may be further included. Further, in a preferred embodiment, when the pattern formed by the trajectory associated with the touch action wholly or partially encompasses the area of one of the candidate results and the shape of the pattern matches the predetermined shape, the specific candidate result may be selected for splitting.

In a further preferred embodiment, the candidate split mode may be triggered when a fraction of the area of the candidate result that is encompassed by the pattern formed by the trajectory associated with the touch action is greater than a predetermined fraction. In this embodiment, forming a closed pattern by the trajectory associated with the touch action, calculating the fraction of the area of the candidate result that is encompassed by the closed pattern, comparing the encompassed fraction with the predetermined fraction and activating the candidate split mode of the encompassed fraction is greater than the predetermined fraction may be further included. Wherein, the predetermined fraction may be determined by the number of candidate results that are encompassed by the closed pattern formed by the trajectory associated with the touch action. For example, it may be determined as 1% in case of only one candidate result being encompassed by the closed pattern or as 40% in case of two or more candidate results being encompassed by the closed pattern.

In a further preferred embodiment, the candidate split mode may be triggered when the start point associated with the detected touch action is located within a predefined triggering region such as, for example, the candidate field, the area of a particular key or another predefined triggering region. In summary, the forgoing preferred embodiments may be implemented in the same terminal device, and the user may be allowed to choose, by using the configuration module, the preferred style in which the candidate split mode is triggered. As such, better human-machine interaction and user experience can be achieved. Further, the above embodiments may also be combined. For example, the candidate split mode will be activated only when the shape of the closed pattern formed by the trajectory associated with the touch action matches the predetermined shape and the fraction of the area of the candidate result is greater than the predetermined fraction.

In a further preferred embodiment, a functional key may contribute the triggering requirement for the candidate split mode. For example, the functional key may be implemented as the space key. In this case, after the candidate result is selected based on the touch action, the candidate split mode may be triggered when the space key is pressed.

Figure 7:

Further, in the candidate split mode, as shown in FIG. 7, an indication may be given to the user. The indication may be implemented as, for example, an icon 410 displayed on the touch screen, darkening or brightening of the touch screen, a vibration of the touch screen or a sound. In one embodiment, in case of the candidate split mode to be triggered in relation to the selected candidate result, for example, when the trajectory associated with the touch action traverses across the area of the candidate result, or when the touch action is a press in the area of the candidate result which lasts for a period of time longer than the predetermined time period threshold, or when the trajectory associated with the touch action forms a pattern in the area of the candidate result which has a shape matched with the predetermined shape, or when a fraction of the candidate result that is encompassed by the pattern formed by the trajectory associated with the touch action is greater than the predetermined fraction, an indication may be provided to the user by changing the brightness or color in which the candidate result is displayed, changing the brightness or color of the other part of the screen than that in which the candidate result is displayed or displaying the candidate result in a particular fashion, for example, bringing the candidate result 412 to a foreground 414 as shown in FIG. 7, raising it to a height, or bolding or underlining it, in order to notify the user of that the candidate split mode has been activated and the candidate result of concern is the one to be split.

It is to be noted that, according to some embodiments of the present disclosure, the determination of whether the triggering requirement for the candidate split mode is satisfied and the selection of the candidate result may be based on the same single detected touch action. For example, if the detected touch action is a downward slide across one of the candidate words, then the candidate word is selected because the trajectory associated with the touch action traverses across the area of the candidate word and the candidate may be activated because the trajectory associated with the touch action proceeds downward. As another example, in one embodiment, when the detected touch action based on which the candidate split mode is triggered involves one of the candidate results, for example, when its associated trajectory traverses across the area of the candidate results or when the pattern formed by the trajectory encompasses at least part of the area of the candidate results, the specific candidate result is determined as the one to be split. In one preferred embodiment, when the trajectory associated with the touch action involves two or more candidate results, whichever of them has a larger overlap with the pattern defined by the trajectory may be selected as the one to be split. According to some embodiments of the present disclosure, successive determinations may be made based on respective touch actions. For example, one of the candidate results may be selected based on a first touch action, followed by determination of whether the candidate split mode is to be activated based on a second touch action. Alternatively, it may be determined whether the candidate split mode is to be activated based on a first touch action, and then one of the candidate results may be selected based on a second touch action.

After the candidate split mode has been triggered and one of the candidate results has been selected for splitting, step S13 is performed in which the selected candidate result is split into the acceptable part and the pending part based on the touch action.

According to some embodiments of the present disclosure, the touch action in step S13 may be the same as at least one of the touch action based on which the candidate split mode is triggered or the touch action based on which the candidate result is selected in step S12. For example, a first touch action may be detected first and it may be determined whether the first touch action meets the triggering requirement for the candidate split mode. If the determination is positive, a second touch action may be detected, based on which one of the candidate results may be selected and split. As another example, a single touch action may be employed both to trigger the candidate split mode and to serves as a basis for selecting and splitting the candidate result. For example, based on the same touch action whose associated trajectory traverses across the area of one of the candidate results, the candidate split mode may be triggered and the candidate result may be split into an acceptable part and a pending part. As a further example, referred to FIG. 8, when the trajectory associated with the touch action 422 traverses across the area of the candidate result "我 愛北京天安嫩 (Chinese phonetic alphabet: Wo Ai Bei Jing Tian An Nen)" and has a length exceeding the predetermined length, the candidate split mode may be triggered and the candidate result may be split. In such embodiments, based on a single touch action, not only is the triggering of the candidate split mode possible, but also is the splitting of the selected candidate result allowed. This can result in time savings, higher input efficiency and improved human-machine interaction.

According to other embodiments of the present disclosure, the touch action in step S13 may differ from either of the touch action based on which the candidate split mode is triggered and the touch action based on which the candidate result is selected in step S12. Specifically, for example, a first touch action may be detected and it may be determined whether the first touch action meets the triggering requirement for the candidate split mode. If the determination is positive, a second touch action may be detected and serve as a basis for selecting one of the candidate results. A third touch action may be further detected and serve as a basis for splitting the selected candidate result. The first touch action may be the same as the second touch action, or the second touch action may be the same as the third touch action. For example, the candidate split mode may be first triggered by a long-press on the space key, the desired one of the candidate results may be then selected and split based on a circle drawn over its area. As another example, the trajectory associated with the touch action may consist of a portion extending from the left upper portion of the screen to one of the candidate results, based on which the candidate split mode is triggered and the candidate result is selected, and another portion that forms a square pattern and encircles the acceptable part of the candidate result, based on which the candidate result is split. The first, second and third touch actions may also be different touch actions. For example, at first, the candidate split mode may be triggered based on a triangle drawn over the keyboard area, and the candidate result of interest may then be selected based on a tap or the input of a corresponding number. After that, based on a slide traversing across the candidate result, the candidate result may be split in a desired manner.

Figure 8:
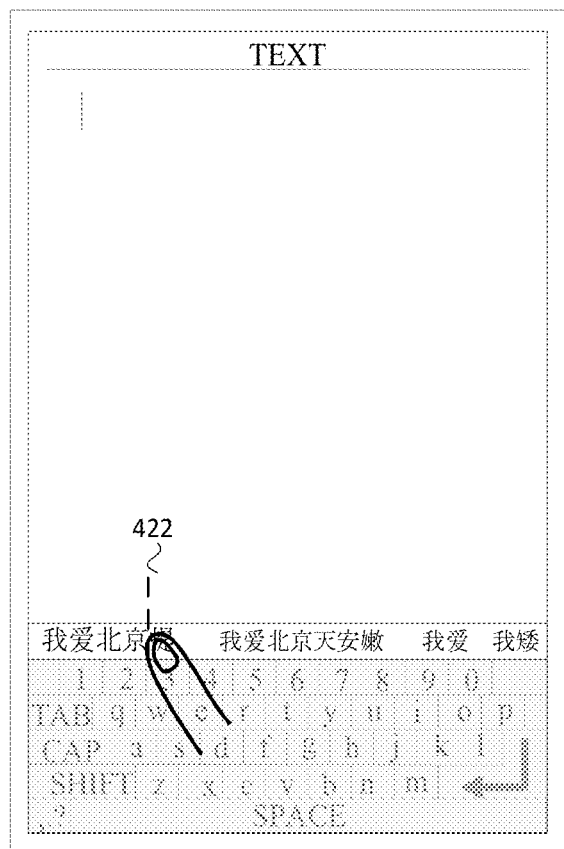

In one embodiment, step S13 may further include splitting the candidate result into the accepted and pending parts with the trajectory associated with the touch action as a split line. Step S13 may further include: providing an indication in respect of characters of interest by a particular display style, for example, by displaying them with higher brightness or in another font color, style or size, bolding or underlining them, floating them, raising or lowering them to a certain height, or bringing them to the foreground. In addition, a graphical representation of the trajectory associated with the touch action may be displayed to indicate to the use how the candidate result will be split. For example, the trajectory may be a line 422 as shown in FIG. 8, or a closed pattern as shown in FIG. 6. In the latter case, the user is allowed to select a certain number of characters in a certain portion of the candidate result, for example, one or more characters in a leading portion, one or more character in a trailing portion or one or more character in a middle potion.

In a specific embodiment, step S13 may further include: determining whether the trajectory associated with the touch action is a line or a closed pattern. If the trajectory is a line, the acceptable part and the pending part of the candidate result may be separated from each other and located, for example, to the left and right thereof, respectively. If the trajectory is a closed pattern, the acceptable part and the pending part of the candidate result may be separated from each other and located, for example, inside and outside it, or alternatively outside and inside it, respectively.

For example, referring to FIG. 6, if the trajectory associated with the touch action is detected to be a closed curve 400 that separates "我爱北京 (Chinese phonetic alphabet: Wo Ai Bei Jing)" in the candidate result "我爱北京天安嫩 (Chinese phonetic alphabet: Wo Ai Bei Jing Tian An Nen)" from the rest thereof, then the part inside the curve 400, i.e., " 我爱北京 (Chinese phonetic alphabet: Wo Ai Bei Jing)" may be taken as the acceptable part, while the part outside the curve 400, i.e., "天安嫩 (Chinese phonetic alphabet: Tian An Nen)" may be taken as the pending part. As another example, referring to FIG. 8, depending on the systems settings, when the trajectory associated with the touch action is a line 422, the leading and trailing parts are taken by default as the accepted and pending parts, respectively.

In one embodiment, the split of the candidate result based on the trajectory associated with the touch action may further include adjusting the split position. The adjustment can be accomplished in two ways, as shown respectively in FIGS. 9 and 10. One of them is to adjust the split position automatically by the system. In a specific embodiment, step S13 may further include the steps of:

(S131) determining whether the split of the candidate result based on the trajectory associated with the touch action has taken place in the middle of any complete single word; and (S132) if yes, shifting the trajectory in front of or behind the word.

Step S131 may be repeated until the trajectory associated with the touch action does not split any complete single word in the candidate result.

Figure 9:
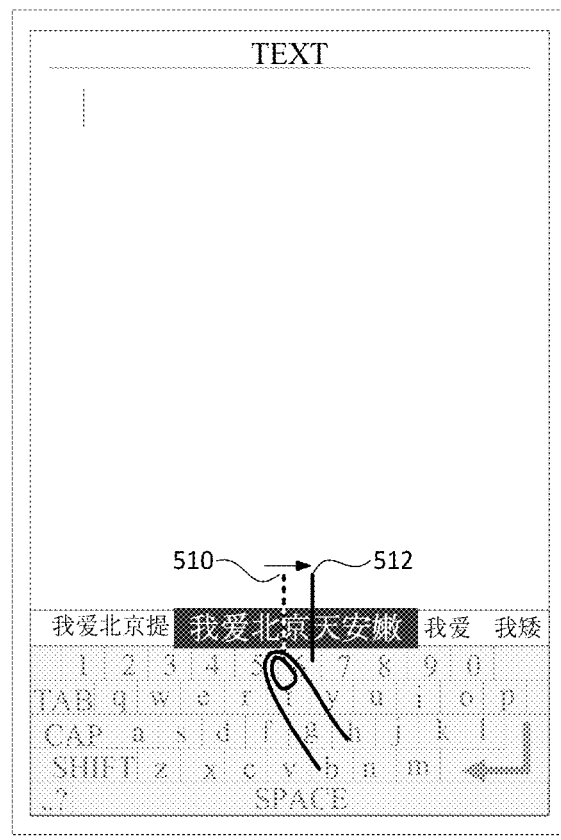
FIG. 9 is a schematic diagram showing an operation for split position adjustment in another embodiment of the method according to some aspects of the present disclosure.
Figure 10:
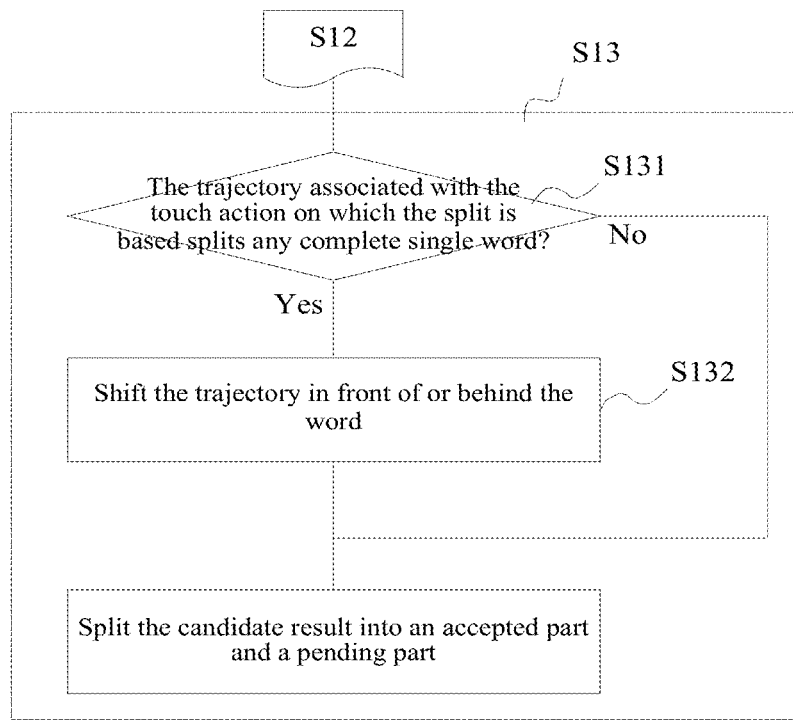
FIG. 10 is a flowchart graphically illustrating a process for split position adjustment in still another embodiment of the method according to some aspects of the present disclosure.

Here, a complete single word is defined as a combination of one or more characters which has a semantically complete, independent meaning, such as "北京 (Chinese phonetic alphabet: Bei Jing)", "天安门 (Chinese phonetic alphabet: Tian An Men)", "我们 (Chinese phonetic alphabet: Wo Men)", etc. In one embodiment, as shown in FIG. 9, if the trajectory associated with the touch action taken by the user traverses behind "我爱北 (Chinese phonetic alphabet: Wo Ai Bei)" in the candidate result "我爱北京天安嫩 (Chinese phonetic alphabet: Wo Ai Bei Jing Tian An Nen)" (as indicated by the dotted line 510 in FIG. 9), since "北京 (Chinese phonetic alphabet: Bei Jing)" is a complete single word, the split position may be shifted behind "我爱北京 (Chinese phonetic alphabet: Wo Ai Bei Jing)" (as indicated by the solid line 512 in FIG. 9). In this way, the input speed and accuracy of the user can be improved.

In another embodiment, the split position may be adjusted by the user. In a specific embodiment, this may specifically include: displaying the accepted and pending parts to the user and prompting the user to determine whether the split is performed as desired; if not, detecting a further touch action and adjusting the split position based on the further touch action; and repeating the preceding steps until a desired split is achieved. For example, when the trajectory associated with the touch action is detected as being proceeding between the characters "京 (Chinese phonetic alphabet: Jing)" and "天 (Chinese phonetic alphabet: Tian)" in the candidate result "我爱北京天 安嫩 (Chinese phonetic alphabet: Wo Ai Bei Jing Tian An Nen)", it may be deflected toward the text "我爱北京 (Chinese phonetic alphabet: Wo Ai Bei Jing)" so that the split position may be shifted in this direction by at least one character to avoid splitting any complete single word. As a result, with the touch action proceeding, the split position originally between "京 (Chinese phonetic alphabet: Jing)" and "天 (Chinese phonetic alphabet: Tian)" may be shifted to between "安 (Chinese phonetic alphabet: An)" and "嫩 (Chinese phonetic alphabet: Nen)", thereby splitting the candidate result into the acceptable part "我爱北京天安 (Chinese phonetic alphabet: Wo Ai Bei Jing Tian An)" and the pending part "嫩 (Chinese phonetic alphabet: Nen)".

Figure 11:
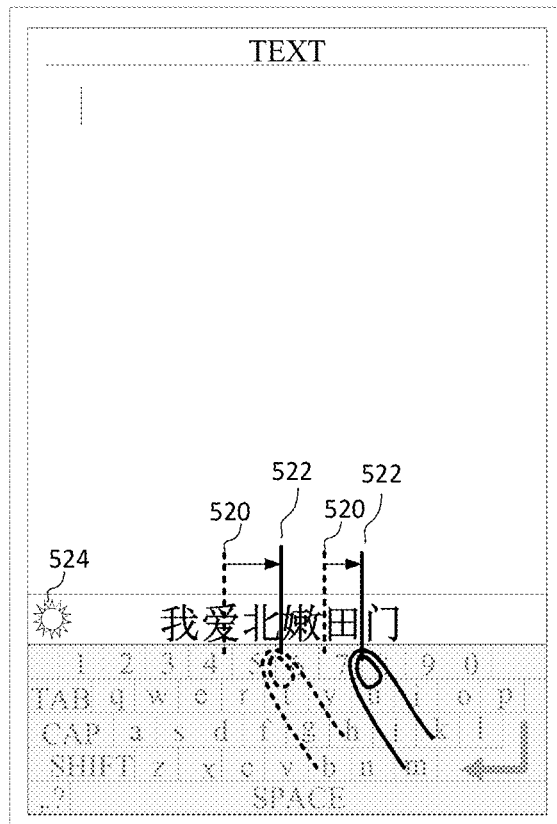
FIG. 11 is a schematic diagram showing an operation for split position adjustment in yet still another embodiment of the method according to some aspects of the present disclosure.

In a further embodiment, after the candidate result is split into the two parts, a further touch action such as, for example, a click action, may be taken to confirm the accepted or pending part. For example, referring to FIG. 11, in response to the misspelling of the character string for the intended text "我爱北京天安门 (Chinese phonetic alphabet: Wo Ai Bei Jing Tian An Men)" as "woaibeinentiananmen" by the user, the candidate result "我爱北嫩田门 (Chinese phonetic alphabet: Wo Ai Bei Nen Tian Men)" may be predicted and displayed, and the system may propose two split positions respectively between "我爱 (Chinese phonetic alphabet: Wo Ai)" and "北嫩 (Chinese phonetic alphabet: Bei Nen)" and between "北嫩 (Chinese phonetic alphabet: Bei Nen)" and " 田门 (Chinese phonetic alphabet: Tian Men)". After a check of the accepted and pending parts, the user may find that the split is not desirable. In this case, the user is allowed to adjust the split positions 510. For example, the device 100 may detect whether there is any touch action adapted to adjust the split positions 520. If yes, a split position adjustment mode may be activated to allow adjustment of the split positions 520 to respective desired positions. For example, upon a touch action for adjusting a split position being detected, coordinate data associated with the touch action may be recorded. If a stay time at a certain position associated with the detected touch action exceeds a predetermined threshold, horizontal and vertical coordinates of the position may be acquired, based on which the target split position may be ascertained. In this way, for example, based on detected touch actions, the split positions 520 respectively between " 我爱 (Chinese phonetic alphabet: Wo Ai)" and "北嫩 (Chinese phonetic alphabet: Bei Nen)" and between "北嫩 (Chinese phonetic alphabet: Bei Nen)" and " 田门 (Chinese phonetic alphabet: Tian Men)" may be adjusted to the positions 522 respectively between " 我爱北 (Chinese phonetic alphabet: Wo Ai Bei Tian Men)" and " 嫩 (Chinese phonetic alphabet: Nen)" and between " 嫩田 (Chinese phonetic alphabet: Nen Tian)" and " 门 (Chinese phonetic alphabet: Men)", respectively.

Furthermore, an indication may be provided in respect of the activation of the split position adjustment mode. The indication may be accomplished by an icon 524 or otherwise such as, for example, a sound, a blinking cursor at the split position, higher display brightness of characters around the split position or a change in their color. In one embodiment, the split position adjustment mode may be terminated by a long press lasting for a time longer than a predetermined time period threshold, or a touch action with a trajectory forming a predetermined shape, or a click on a predetermined key.

After the accepted and pending parts are acquired, step S2 is performed to handle these parts. That is, the acceptable part is added to the target text field, and the pending part is subjected to a secondary candidate prediction for acquiring secondary candidate results based on the character string corresponding to the pending part.

Accordingly, step S2 may further include: adding the acceptable part to the target text field and removing the acceptable part from the candidate result.

Figure 12:
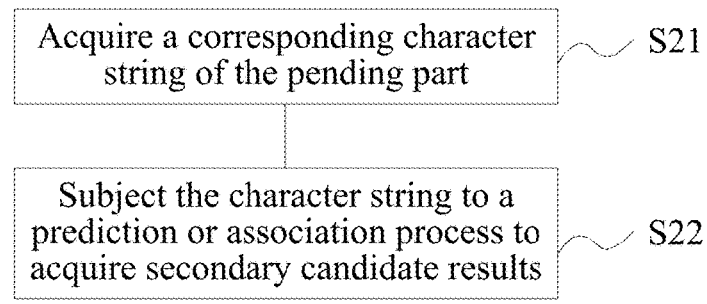
FIG. 12 is a flowchart graphically illustrating an embodiment of step S2 of FIG. 2.

Referring to FIG. 12, step S2 may include the following steps for handling the pending part: (S21) obtaining the character string corresponding to the pending part; and (S22) subjecting the obtained character string to another prediction or association process to acquire secondary candidate results. The secondary candidate results are provided to the user, and steps S11 to S13 are repeated until the desired text is completely entered.

Referring back to FIG. 1, according to the present disclosure, a text input process may generally begin with capture of signals generated from the user's typing operation by the interaction module 110. The signals may then be converted to a character string based on the used keyboard layout. Subsequently, the interaction module 110 may pass the character string on to the engine module 120 which may then perform a prediction or association process based on the character string to obtain one or more candidate results. The candidate results may then be fed back to the interaction module 110. As the candidate results are obtained by prediction or association, their respective corresponding character strings tend to not be exactly the same as the actually converted character string. For example, for the character string "bianqian" actually converted from the signals from the user's typing operation, the candidate results "年前 (Chinese phonetic alphabet: Nian Qian)", "不安全 (Chinese phonetic alphabet: Bu An Quan)", "暖泉 (Chinese phonetic alphabet: Nuan Quan)" and "边去 (Chinese phonetic alphabet: Bian Qu)" may be obtained from the prediction or association process carried out by the engine module 120 based on the actually converted character string, whose corresponding character strings, i.e., "nianqian (Chinese characters: 年前)", "buanquan (Chinese characters: 不安全)", "nuanquan (Chinese characters: 暖泉)", "bianqu (Chinese characters: 边去)", are not exactly the same as the actually converted character string. After the candidate results have been obtained, the engine module 120 may transmit these candidate results, together with, their corresponding character strings as well as the actually converted character string received from the interaction module 110, to the interaction module 110 which may then display them to the user. However, as the engine module 120 remains uninformed of any action taken by the user during the split of the selected one of the candidate results thereby, it is necessary to first acquire the character string corresponding to the pending part.

In a preferred embodiment, step S21 may further include: acquisition of the character string corresponding to the pending part by the interaction module 110 based on the split position and mappings of individual characters in the candidate result to characters in its corresponding character string, wherein each of the characters in the candidate result is mapped to one or more characters in the corresponding character string. The mappings may be provided by the engine module 120 and stored on the interaction module 110. Alternatively, the mappings may be created by the interaction module 110 from a comparison of the candidate result to the character string and stored thereon. Following that, the interaction module 110 may conduct a calculation based on the split position. For example, it may calculate the number of characters in the pending part based on a character pitch at the split position and the total character number of the candidate result. As another example, the calculation may also be based on coordinates of the split position. In step S21, the retrieval of the mappings may precede the calculation of the number of characters in the pending part; or the calculation of the number of characters in the pending part may precede the retrieval of the mappings; or the retrieval of the mappings may occurs at the same time as the calculation of the number of characters in the pending part. Based on the retrieved mappings and the calculated number of characters in the pending part, the corresponding character string of the pending part may be obtained. In an alternative embodiment, the corresponding character string of the pending part may also be obtained based on a calculation carried out by the engine module 120 based on the split position.

Here, since the candidate prediction is based on a character string that probably contains, apart from the character string actually entered by the user, recommended possible characters added behind the character string, the candidate results may include not only those predicted based only on the actually entered character string but also those predicted partially or wholly on the added characters. When the character string based on which the split candidate result is acquired contains both the actually entered character string and additional recommended characters, it may happen that after the user adds the acceptable part to the target text field, corresponding character string of the pending part does not contain any character in the actually entered character string. This problem can be solved by taking into account, during the calculation of the corresponding character string of the pending part, not only the character string actually entered by the user but also the character string based on the split candidate result is obtained. In this way, not only can the effectiveness of each character entered by the user be ensured, but also can reasonable prediction based on a few additional characters that are not actually entered by the user be allowed.

Figure 13A:
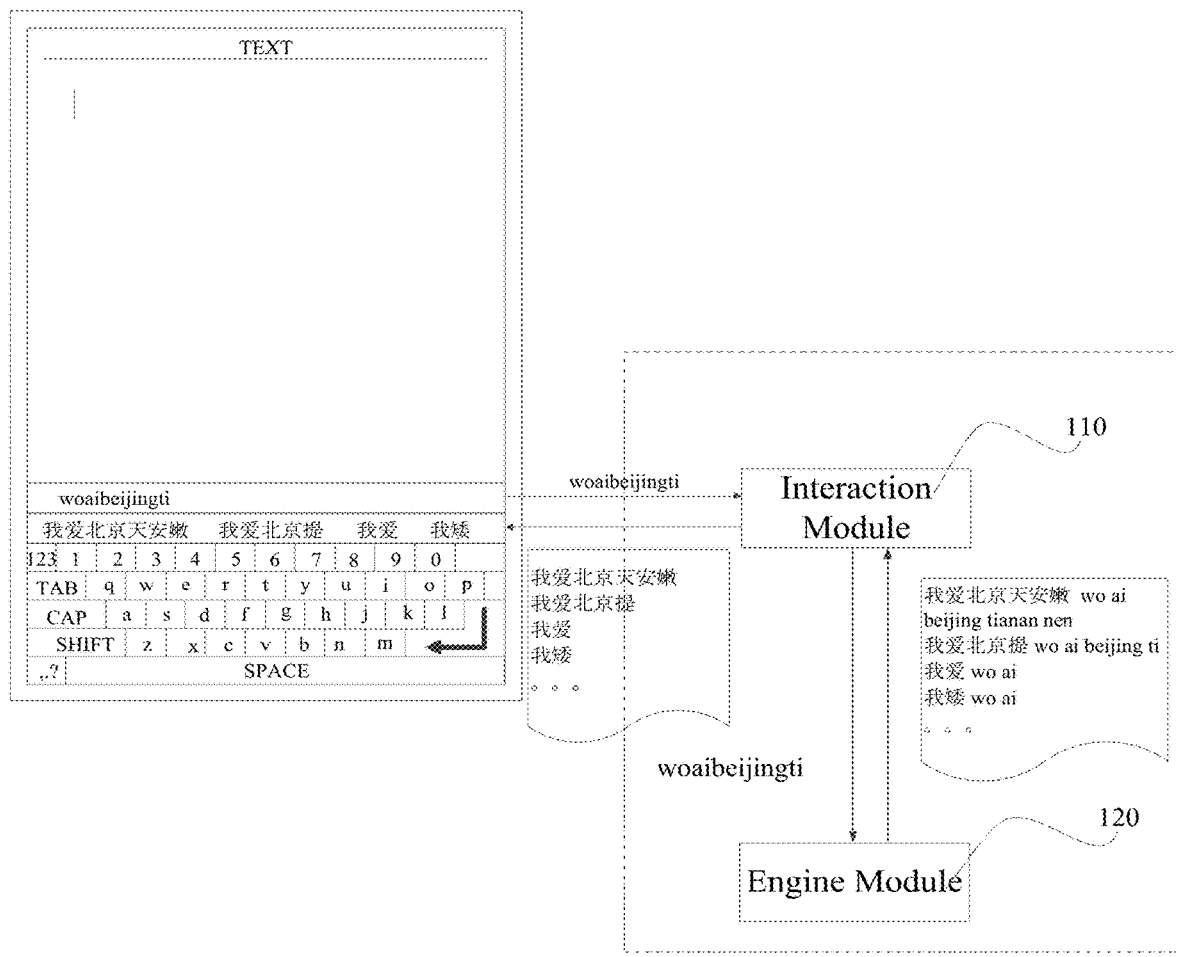
FIGS. 13*a* to 13*c* are schematic diagrams showing operations in a further embodiment of the method according to some aspects of the present disclosure.
Figure 13B:
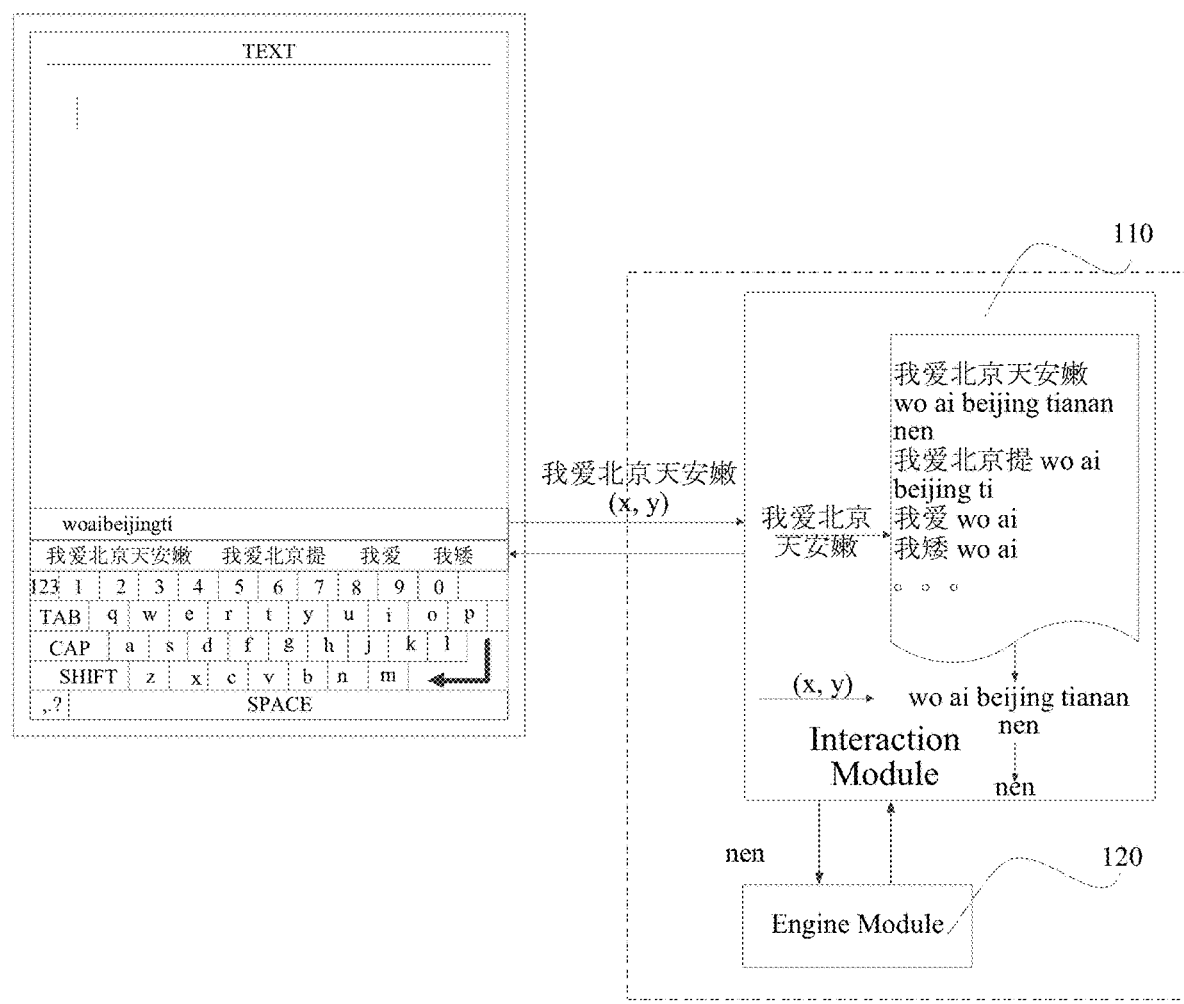
Figure 13C:
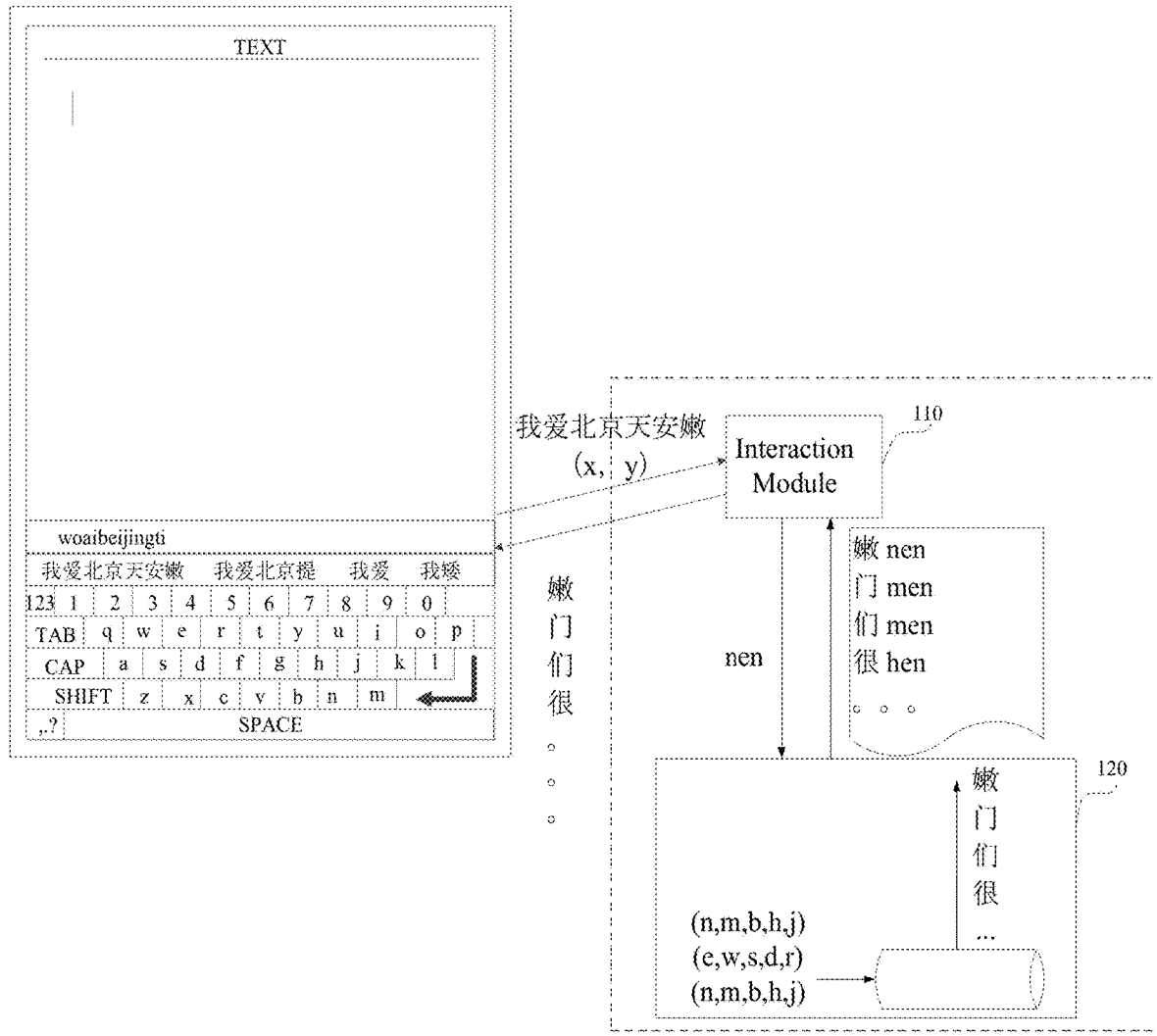

FIGS. 13*a* to 13*c* show a flowchart of a text input process according to some embodiments of the present disclosure. As shown in FIG. 13*a*, in response to the entered string "woaibeijingti", "我爱北京天安嫩 (Chinese phonetic alphabet: Wo Ai Bei Jing Tian An Men)" is displayed as one of candidate results. Wherein, the engine module 120 performs a prediction based on the entered character string and provides the predicted candidate results, together with the character strings corresponding to these predicted candidate results, to the interaction module 110 which then displays the candidate results to the user. Some of the character strings corresponding to the predicted candidate results may contain additional character(s), apart from the entered character string.

Subsequently, referring to FIG. 13*b*, after a split of the candidate result at the split position between "

我爱北京天安 (Chinese phonetic alphabet: Wo Ai Bei Jing Tian An)" and "嫩 (Chinese phonetic alphabet: Nen)" is detected, the interaction module 110, based on the split position, identifies the character "嫩 (Chinese phonetic alphabet: Nen)" constituting the pending part and reverts the character back to the corresponding character string, i.e., "nen", which is not part of the character string actually entered by the user but a string consisting of characters added during the prediction based on the actually entered character string, and will serve as a basis for the subsequent prediction of secondary candidate results.

Afterward, step S22 is performed in which the interaction module 110 transmits the corresponding character string of the pending part to the engine module 120 which then performs a prediction or association process based on the corresponding character string and obtains secondary candidate results for the character string.

In a specific embodiment of step S22, the prediction or association process is performed based on the character string that has not been subjected to any processing. In an alternative embodiment, the character string may also be modified before it is subjected to the prediction or association process. For example, referring to FIG. 13c, for each character in the corresponding character string of the pending part, all possible alternatives according to the configuration of the used keyboard layout may be acquired. Secondary candidate results may then be obtained based on all possible combinations of the alternative characters.

Specifically, the pending part that deviates from the user's expectation may be attributable to selection of a wrong alternative character for a correct key or pressing of a wrong key by the user. For example, instead of the candidate text "我爱北京天安嫩 (Chinese phonetic alphabet: Wo Ai Bei Jing Tian An Nen)", the user may have intended to enter "我爱北京天安门 (Chinese phonetic alphabet: Wo Ai Bei Jing Tian An Men)". After splitting the candidate result and adding "我爱北京天安 (Chinese phonetic alphabet: Wo Ai Bei Jing Tian An)" to the target text field, the user may revert the pending part "嫩 (Chinese phonetic alphabet: Nen)" to "nen" consisting of the three characters "N", "E" and "N". In case of an alphanumeric keypad layout being currently used, possible alternative characters for the first character "N" will be "N", "M" and "O", those for the second character "E" will be "D", "E" and "F", and those for the third character "N" will also be "N", "M" and "O". Therefore, all possible combinations of these alternative characters are "NEN" and "MEN". Characters corresponding to these combinations may then be acquired, for example, "嫩 (Chinese phonetic alphabet: Nen)", "恁 (Chinese phonetic alphabet: Nen)" and the like for "NEN", and "门 (Chinese phonetic alphabet: Men)", "们 (Chinese phonetic alphabet: Men)" and the like for "MEN". In this way, the system can perform automatic correction during the acquisition of the secondary candidate results.

Figure 14:
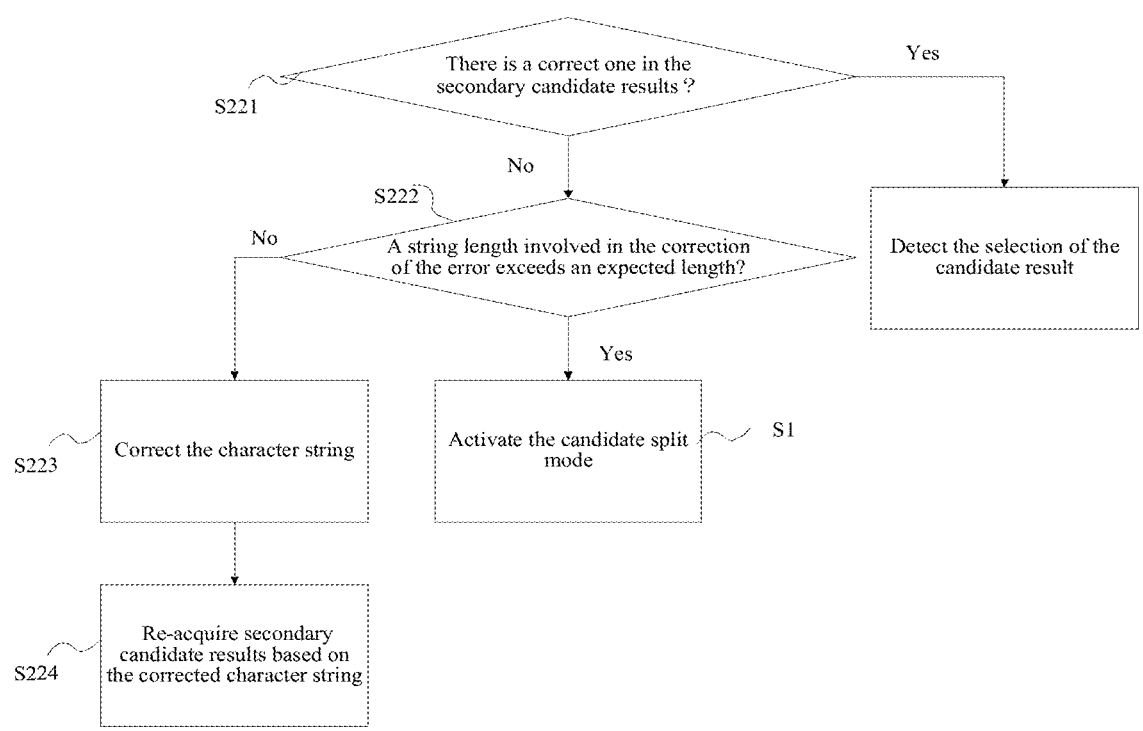
FIG. 14 is a flowchart graphically illustrating an embodiment of step S21 of FIG. 12.

Alternatively, the correction during the acquisition of the secondary candidate results may also be carried out by the user himself/herself instead of automatically by the system based on the used keyboard layout. Referring to FIG. 14, in one embodiment, the may specifically include the steps of: (S221) determining whether there is a correct one in the secondary candidate results; (S222) if there is an error in the character string based on which the secondary candidate results are predicted, determining whether a string length involved in the correction of the error exceeds an expected length; (S223) if not, activating a manual correction mode and correcting the character string; and (S224) re-acquiring secondary candidate results based on the corrected character string.

According to some embodiments, the determination of whether there is an error in the character string based on which the secondary candidate results are predicted may be performed subsequent to the automatic correction carried out by the system. That is, if there is no correct one in the secondary candidate results from the automatic correction performed by the system based on the keyboard layout configuration, the user may determine whether the character string based on which the secondary candidate results are acquired is correct.

In addition, step S221 may further include: if there is a correct one in the secondary candidate results, adding the correct secondary candidate result to the target text field in response to the selection of it by the user, so that the location of the secondary candidate result corresponds to the location of its corresponding character string in the entered character string.

Figure 15:
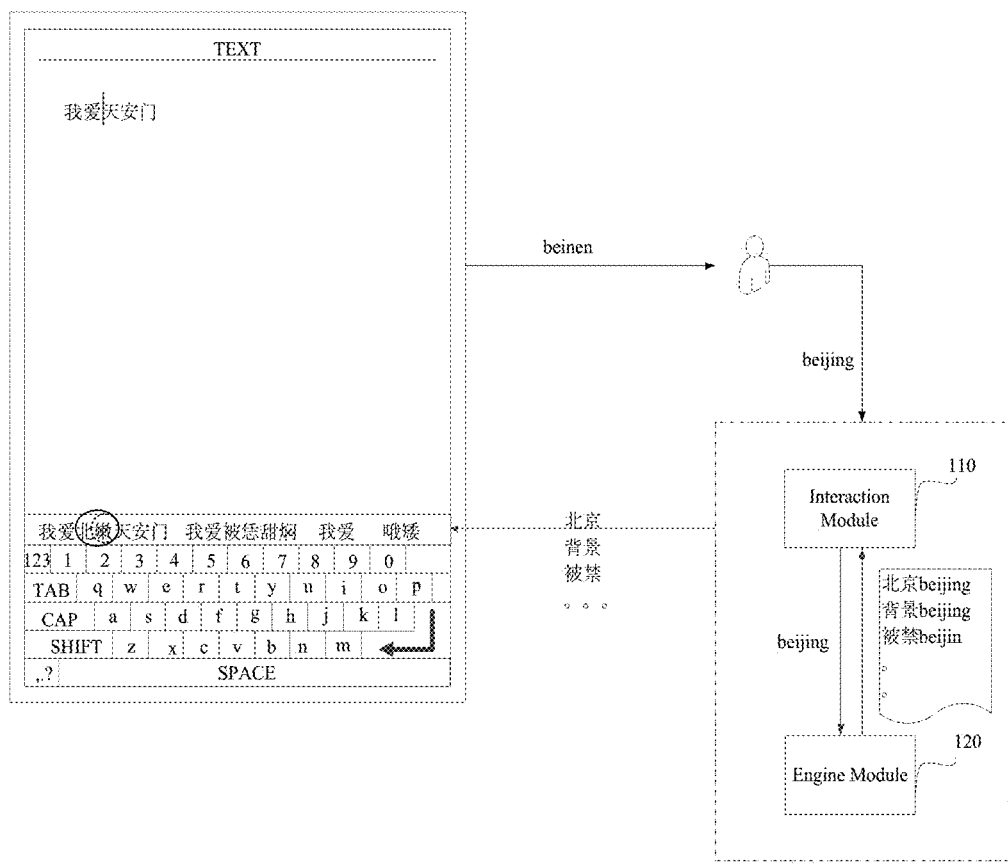
FIG. 15 is a schematic diagram showing an operation in a further embodiment of the method according to some aspects of the present disclosure.

Referring to FIG. 15, in a specific implementation, for the candidate result "我爱北嫩天安门 (Chinese phonetic alphabet: Wo Ai Bei Nen Tian An Men)", "我爱 (Chinese phonetic alphabet: Wo Ai)" and "天安门 (Chinese phonetic alphabet: Tian An Men)" may both be desired while "北嫩 (Chinese phonetic alphabet: Bei Nen)" is not (here, "北嫩 (Chinese phonetic alphabet: Bei Nen)" rather than "嫩 (Chinese phonetic alphabet: Nen)" is split out because in an automatic split position adjustment performed by the system, "北嫩 (Chinese phonetic alphabet: Bei Nen)" is mistakenly taken as a complete single word). The user may then add the other parts than "北嫩 (Chinese phonetic alphabet: Bei Nen)" to the target text field. It is to be noted that in this case, the erroneous part "北嫩 (Chinese phonetic alphabet: Bei Nen)" is identified by the user himself/herself and the corresponding character string "beinen" may be corrected to "beijing" for the correct secondary candidate result "北京 (Chinese phonetic alphabet: Bei Jing)", with the cursor being located between the acceptable parts "我爱 (Chinese phonetic alphabet: Wo Ai)" and "天安门 (Chinese phonetic alphabet: Tian An Men)" to allow "北京 (Chinese phonetic alphabet: Bei Jing)" be added between "我爱 (Chinese phonetic alphabet: Wo Ai)" and "天安门 (Chinese phonetic alphabet: Tian An Men)" in the target text field. It is to be further noted that, in response to the addition of the candidate result "北京 (Chinese phonetic alphabet: Bei Jing)" to the target text field, the cursor may be shifted to behind "天安门 (Chinese phonetic alphabet: Tian An Men)" so as to allow correct input of subsequent text in the target text field.

According to some embodiments, the mechanism for secondary input of text according to the present disclosure is applicable to text input in any language such as, for example, English, French, German, Spanish or Portuguese in the Indo-European family, or Chinese in the Chinese-Tibetan family, or Japanese or Korean in the Altaic family. In terms of keyboard layout, the mechanism support the most popular QWERTY layout, AZERTY layout commonly used in text input in French and other keyboard layouts.

According to some embodiments of the present disclosure, with the above method or device for secondary input of text, the input speed and accuracy can be improved because they allow acquisition of secondary candidate results for an undesired part of a candidate result, modification of an entered character string based on the used keyboard layout and correction of only any erroneous part of an entered character string without affecting the acceptance of a correct candidate result corresponding to the remainder of the character string.

According to some embodiments of the present disclosure, the above method or device for secondary input of text allow better human-machine interaction and have wide applicability because they enable the split position to be so adjusted that a maximum number of correct characters in a candidate result can be added to the target text field, leaving a minimized number of characters to be corrected subsequently.

According to some embodiments of the present disclosure, with the above method or device for secondary input of text, the user is allowed to modify any candidate result at any time as desired while retaining the desired part during the input process. This entails a more prompt and more efficient input feedback mechanism which simplifies the user's manipulation and improves the user's experience.

Although the present disclosure has been described herein with reference to a few specific embodiments, it is apparent that various modifications and changes can be made without departing from the spirit and scope of the invention. Accordingly, the description and accompanying drawings are intended to be illustrative rather than limiting.

What is claimed is:

1. A method for input with candidate split mode, comprising:
    detecting a touch action, when the touch action meets a triggering requirement for a candidate split mode, activating the candidate split mode, in which, selecting one of candidate results in a candidate field and splitting the selected candidate result into an acceptable part and a pending part located in the candidate field;
    adding the acceptable part to a target text field directly and removing the acceptable part from the candidate result, the pending part being remained in the candidate field;
    reverting the pending part back to a character string; and
    acquiring a secondary candidate based on the character string,
    wherein the triggering requirement for the candidate split mode comprises:
    a fraction that an area of any of the candidate results encompassed by a pattern defined by a trajectory accounts for of a total area of the candidate result that is greater than a predetermined fraction,
    wherein the method further comprises:
    forming a closed pattern by the trajectory located in the candidate field; calculating the area of the candidate result encompassed by the closed pattern;
    calculating the fraction that the encompassed area accounts for of the total area of the candidate result; and activating the candidate split mode if the fraction that the encompassed area accounts for of the total area of the candidate result is greater than the predetermined fraction.

2. The method of claim 1, wherein the acceptable part is not an initial part of the candidate result.

3. The method of claim 1, wherein selecting one of candidate results comprises: acquiring coordinates associated with the touch action; and determining the candidate result based on a position or trajectory associated with the touch action.

4. The method of claim 3, wherein selecting one of the candidate results comprises:
    in case of the touch action based on which the candidate split mode is triggered being associated with a trajectory that traverses across, or forms a pattern encompassing at least part of, one of the candidate results, selecting this one of the candidate results.

5. The method of claim 2, wherein splitting the candidate result into the acceptable part and the pending part comprises:
    separating the candidate result into the acceptable part and the pending part by a trajectory associated with the touch action based on which the split is conducted, wherein the acceptable part and the pending part are on separate sides of said trajectory.

6. The method of claim 2, wherein an indication is provided in respect of the activation of the candidate split mode, or the selection of the candidate result or the split of the candidate result into the acceptable part and the pending part and is accomplished by one or a combination of: a vibration of a touch screen, a sound, a change in the brightness, color or font in which the candidate result is displayed or display of the candidate result in a particular manner.

7. The method of claim 2, further comprising, prior to the detection of the touch action, acquiring the candidate results based on an entered character string.

8. A device for input with candidate split mode, comprising:
    an interaction module, adapted to detect a touch action, when the touch action meets a triggering requirement for a candidate split mode, activate the candidate split mode and, in the candidate split mode, select one of candidate results in a candidate field and split the selected candidate result into an acceptable part and a pending part located in the candidate field, wherein the acceptable part is set to be presented into a target text field directly; add the acceptable part to the target text field directly and remove the acceptable part from the candidate result, the pending part being remained in the candidate field; and revert the pending part back to a character string; and
    an engine module, adapted to acquire a secondary candidate result based on the character string,
    wherein the triggering requirement for the candidate split mode comprises:
    a fraction that an area of any of the candidate results encompassed by a pattern defined by a trajectory accounts for of a total area of the candidate result that is greater than a predetermined fraction,
    wherein the interaction module is further adapted to:
    form a closed pattern by the trajectory located in the candidate field; calculate the area of the candidate result encompassed by the closed pattern;
    calculate the fraction that the encompassed area accounts for of the total area of the candidate result; and activate the candidate split mode if the fraction that the encompassed area accounts for of the total area of the candidate result is greater than the predetermined fraction.

9. The device of claim 8, wherein the interaction module is adapted to acquire the character string corresponding to the pending part based on a split position and mappings of individual characters in the candidate result to characters in a character string based on which the candidate result is acquired, each of the characters in the candidate result being mapped to one or more of the characters in the character string based on which the candidate result is acquired.

10. The device of claim 9, wherein the acquisition of the character string corresponding to the pending part by the interaction module comprises:
    calculating one or more characters that constitute the pending part based on a distance between two adjacent characters at the split position and the total character number of the candidate result; or obtaining the one or more characters that constitute the pending part from a calculation based on coordinates of the split position.

11. The device of claim 8, wherein the acceptable part is not an initial part of the candidate result.

12. The device of claim 8, wherein the interaction module is adapted to:

detect a first touch action, determine whether the first touch action meets the triggering requirement for the candidate split mode, when the candidate split mode is determined, detect a second touch action in the candidate split mode and select and split one of the candidate results based on the second touch action; or detect a third touch action, determine whether the third touch action meets the triggering requirement for the candidate split mode, select one of the candidate results, when the candidate split mode is determined, detect a third touch action in the candidate split mode and split the selected candidate result based on the third touch action.

13. The device of claim 8, wherein the interaction module is further adapted to adjust the split position.

14. The method of claim 1, wherein the detecting a touch action, when the touch action meets a triggering requirement for a candidate split mode, activating the candidate split mode, in which, selecting one of candidate results in a candidate field and splitting the selected candidate result into an acceptable part and a pending part located in the candidate field, comprising:

detecting a first touch action and determining whether the first touch action meets the triggering requirement for the candidate split mode; and in the candidate split mode, detecting a second touch action, selecting and splitting one of the candidate results based on the second touch action.

15. The method of claim 1, wherein the detecting a touch action, when the touch action meets a triggering requirement for a candidate split mode, activating the candidate split mode, in which, selecting one of candidate results in a candidate field and splitting the selected candidate result into an acceptable part and a pending part located in the candidate field, comprising:

detecting a first touch action, determining whether the first touch action meets the triggering requirement for the candidate split mode and selecting one of the candidate results; and in the candidate split mode, detecting a second touch action, and splitting the selected candidate result based on the second touch action.

16. The method of claim 14, wherein acquiring the secondary candidate results based on the character string corresponding to the pending part comprises:

acquiring a character string corresponding to the pending part based on a split position of the candidate result; and acquiring a secondary candidate result based on the character string corresponding to the pending part.

17. The method of claim 16, wherein the split further comprises adjusting the split position.

18. The method of claim 17, wherein adjusting the split position comprises:

determining whether a trajectory associated with the touch action on which the split is based traverses across a complete single word in the candidate result;

when said trajectory traverses across a complete single word in the candidate result, shifting the trajectory in front of or behind the word, wherein the complete single word is a word or a word combination that has a semantically complete, independent meaning.

19. The method of claim 15, wherein acquiring the secondary candidate results based on the character string corresponding to the pending part comprises:

acquiring a character string corresponding to the pending part based on the split position of the candidate result; and acquiring a secondary candidate result based on the character string corresponding to the pending part.

20. The method of claim 19, wherein the split further comprises adjusting the split position.

21. The method of claim 20, wherein adjusting the split position comprises:

determining whether a trajectory associated with the touch action on which the split is based traverses across a complete single word in the candidate result;

when said trajectory traverses across a complete single word in the candidate result, shifting the trajectory in front of or behind the word, wherein the complete single word is a word or a word combination that has a semantically complete, independent meaning.

22. The method of claim 3, wherein selecting one of the candidate results comprises:

in case of the touch action based on which the candidate split mode is triggered being associated with a trajectory that forms a pattern overlapping with two or more of the candidate results, selecting whichever of the two or more of the candidate results has a larger overlap with the pattern as the candidate result.

* * * * *